April 21, 1959

W. D. KEITH ET AL 2,883,013

FLUID COUPLED LOAD BRAKING APPARATUS

Original Filed Aug. 14, 1950

Wayland D. Keith
John V. Hollowell
INVENTORS.

BY
Wayland D. Keith
AGENT.

United States Patent Office 2,883,013
Patented Apr. 21, 1959

2,883,013

FLUID COUPLED LOAD BRAKING APPARATUS

Wayland D. Keith, Wichita Falls, Tex., and John V. Hollowell, Morganton, N.C.; said Hollowell assignor to said Keith Continuation of abandoned application Serial No. 179,104, August 14, 1950. This application October 25, 1954, Serial No. 464,328

5 Claims. (Cl. 192—2)

This invention relates to improvements in fluid coupled power transmitting and braking apparatus, and more particularly to an apparatus for retarding moving loads as uniformly as such loads are accelerated, on such devices as amusement rides and other power driven elements, wherein it is desirable to alleviate shock during the retarding and stopping of the load.

An object of this invention is to provide a fluid coupling which is interposed, in driving relation, between a prime mover and the driven load, to provide for uniformly retarding the moving load, while it is being stopped, the same as it is uniformly accelerated during the starting thereof.

Another object of the invention is to provide a device which is simple in construction and operation, and which is easy to service.

With these objects in mind and others that will be manifest as the description proceeds, reference is to be had to the accompanying drawings, in which.

Figure 1:
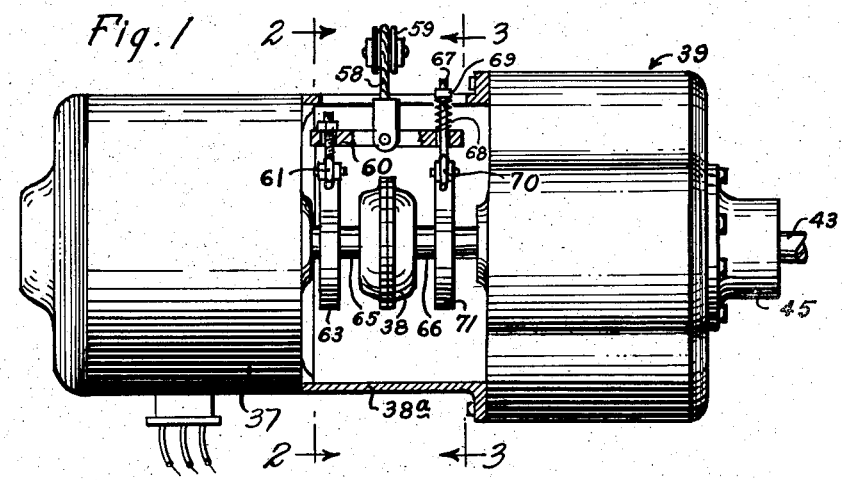
Fig. 1 is a plan view of the device embodying the invention, partly in section and with parts broken away to show the details of the braking mechanism.
Figure 2:
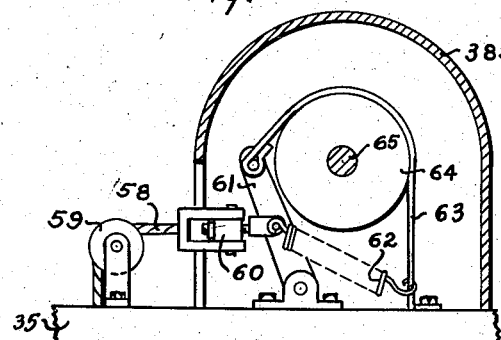
Fig. 2 is a sectional view taken on the line 2—2 of Fig. 1, looking in the direction indicated by the arrows.
Figure 3:
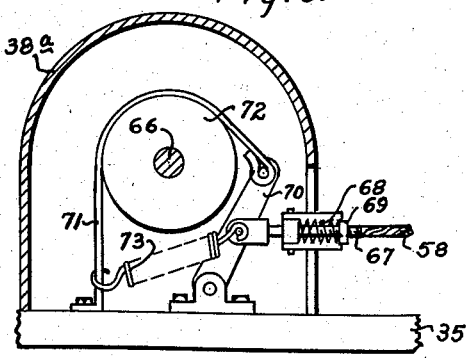
Fig. 3 is a sectional view taken on the line 3—3 of Fig. 1, looking in the direction indicated by the arrows.
Figure 4:
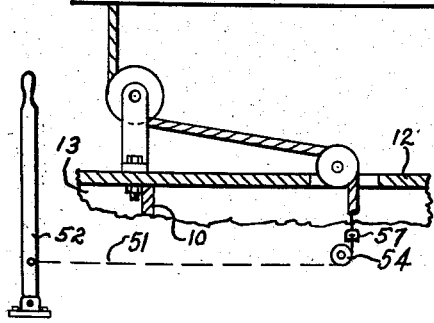
Fig. 4 is an elevational view of the device as shown in Fig. 1, with parts broken away and shown in section to illustrate the details of construction, which view is on a reduced scale.
Figure 4:
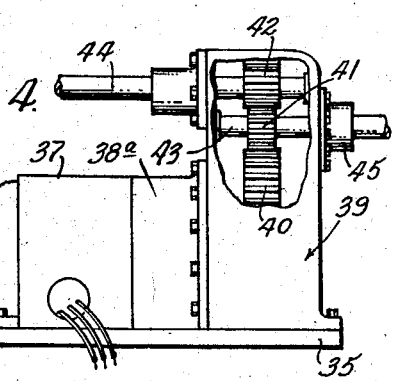

With more detailed reference to the drawing, the numeral 35 designates a platform or mounting base, which carries a motor 37, a fluid drive unit 38 and a gear reducing unit, generally designated at 39. The gear reduction unit 39 has a gear 40 driving a pinion 41, which in turn drives a second pinion gear 42. Pinion gears 41 and 42 are of equal diameter and give a one to one ratio of shafts 43 and 44. With the pinions 41 and 42 in mesh and driven by gear 40, the pinions will be caused to rotate in opposite directions.

A brake cable 51 extends from lever 52 over pulley 54 upward to the brake mechanism, as will be brought out more fully hereinafter. The cable 58 connects to a swivel coupling 57 which cable rotates with a rotating element, while cable 51 below the swivel coupling 57 is maintained against rotation. The brake cable 58 continues upward over a pulley 59 to a "singletree" equalizer 60 and upon the initial pull of the brake cable 58 brake lever 61 will be moved against tension of brake release spring 62 to cause brake band 63 to engage brake drum 64 positioned on shaft 65 intermediate motor 37 and fluid drive coupling 38. One end of the spring 62 is connected to the brake lever 61, and the other end thereof is connected to an anchor on base 35. This will slow or seize the shaft and cause one of the units of impeller blades within the fluid coupling 38 to slow or stop causing the opposed impeller blade unit within the fluid coupling 38 to generate a reactionary pressure to slow shaft 66, on fluid coupling unit 38, a graduated amount so as to retard the speed of the driven element without causing any reactionary shock.

At the opposite end of the "singletree" member 60 is connected a bolt member 67 which has a spring 68 positioned intermediate the "singletree" and a nut 69 so as to permit travel of the end of the "singletree" to which the bolt 67 connects after the opposite end of the "singletree" has stopped. The bolt 67 connects with a lever 70 which lever is connected to a brake band 71, which brake band partially surrounds brake drum 72. A brake band release spring 73, much stronger than brake band release spring 62, is connected to brake lever 70 and to an anchor on base 35, so as to maintain brake lever 70 against movement until brake band 63 has engaged brake drum 64 with sufficient friction to prevent rotation of the brake drum. Upon movement of brake lever 70, positive braking action is imparted by brake band 71 to brake drum 72, mounted on shaft 66 to hold shaft 66 against rotation.

It will be appreciated that a slowing action may be accorded the driven element by brake band 63 first engaging brake drum 64 to cause the fluid in fluid coupling 38 to retard the impeller connected to shaft 66 in a manner well understood in the art of fluid couplings. However, upon further movement of brake cable 58, brake band 71 is engaged in a varying amount according to the pressure applied to the braking system. The brake may be applied suddenly for emergency action, or gradually, as desired.

The prime mover 37, as shown in the drawings, is shown to be an electric motor, wherein electrical conductors are connected thereto in a manner well understood in the art. The motor 37 and the gear reduction unit 39 are shown to be integrally connected by housing 38a, so as to form a composite unit.

Operation

In the operation of the device, the current is directed through conductors to the motor 37 in a manner well known in the art. The motor 37 may be of the reversible type so that the shaft 65 may be rotated in a selected direction.

By having the fluid drive 38 interposed between the motor 37 and gear reduction unit 39, this enables the motor to be started "across the line" and with the fluid coupling giving a gradual starting action to the driven element, which gradual starting action is characteristic of fluid coupling drives. Brake bands 63 and 71 are positioned around the respective brake drums 64 and 72 and with both brake bands connected through a "singletree" to a common brake cable 58, the braking system is established. A weak brake return spring 62 is positioned on brake band 63 and a strong brake return spring 73 is positioned on brake band 71 and in this manner, upon the application of brake lever 52, brake cables 51 and 58 will be tightened and brake band 63 will stop or slow motor shaft 65, yet the inertia of the driven element will cause driven shaft 66 to rotate, thereby rotating the impeller within the fluid coupling 38 to impinge the fluid in a manner so as to retard shaft 66 in approximately the same proportion as it was originally accelerated by the starting of driven element by the motor 37. This will minimize shock to the machinery, as well as to alleviate strain on the various parts due to the inertia of the driven element and the load thereon.

In the moving of brake lever 52 to a position to cause brake band 63 to lock brake drum 64, only a portion of the travel of the brake lever will be used, so upon further movement of the lever, spring 68 will be thoroughly compressed and the brake lever 70, to which band 71 is connected, will move against tension of stout spring 73 to engage brake drum 72, so as to cause a slowing or positive stopping of the driven element. With the brake lever 52 in a position to fully engage brake band 71 the driven element can be held fixed in any position.

Having thus described the invention, what is claimed is:

1. In a load driving and braking apparatus, the combination with a prime mover and a slip type drive mechanism having driving and driven elements interposed in power transmitting relation between the prime mover and the load, of brake mechanism operatively connected to that element of the slip drive mechanism which is driven by the prime mover, a second brake mechanism operatively connected to that element of the slip drive mechanism which is connected to the load, means to apply the first named brake to hold the associated element of the slip drive mechanism against rotation, and means to apply the second named brake after the first brake has been applied and before the load comes to rest.

2. In a power device having a prime mover, a coupling element and a driven element, said coupling element being interposed between said prime mover and said driven element and connected therewith for relative slippage therebetween when rotating in driving relation, a brake element connected with said prime mover in braking relation, a second brake element connected to said driven element in braking relation, means to apply braking action to said first mentioned brake element so as to cause a retarding of said driven element through said coupling, and brake applying means connected with said second brake element to apply further braking action to said driven element.

3. In a power device having a prime mover, a fluid coupling and a driven element, said fluid coupling being interposed between said prime mover and said driven element and connected thereto in fluid driving relation, a brake element connected with said prime mover in braking relation, a second brake element connected with said driven element in braking relation, means to apply braking action to said first mentioned brake element so as to cause a retarding of said driven element by impinging the flow of fluid in said fluid coupling, and brake applying means connected with said second brake element to apply further braking action to said driven element.

4. In a power device, a prime mover having a shaft, a driven element having a shaft, which shaft is in axial alignment with said shaft of said prime mover, a fluid coupling interposed between said shafts and connected therewith in fluid driving relation, a brake drum on the shaft of said prime mover, a second brake drum on the shaft of said driven element, frictional braking elements for each of said brake drums and engageable with the respective drums, loose linkage means connected with each of said frictional braking elements to enable the application of braking action to said prime mover and to said driven element successively.

5. In a power device having a prime mover, a fluid coupling and a driven element, said fluid coupling being interposed between said prime mover and said driven element and being connected thereto in fluid driving relation, a brake element connected with said prime mover in braking relation, a second brake element connected with said driven element in braking relation, an equalizing member connected to said brakes, a linkage member connected to said equalizing member to apply braking action to said first mentioned brake during a predetermined length of travel of said linkage so as to cause a retarding of said driven element by impinging the flow of fluid in said fluid coupling, a relatively non-movable anchor mounted on said power device, a spring connected between said second brake and said relatively non-movable anchor tending to restrain engagement of said second brake with said driven element during the initial braking action of said first mentioned brake by the movement of said linkage, said linkage member being connected to said equalizing member to cause said spring to yield upon further movement of said linkage member to apply braking action by said second brake to said driven element.

References Cited in the file of this patent

UNITED STATES PATENTS

| 2,328,852 | Shepherd | Sept. 7, 1943 |
| 2,681,717 | Spurgeon | June 22, 1954 |